United States Patent Office 3,206,338
Patented Sept. 14, 1965

3,206,338
NON-PYROPHORIC, FERROMAGNETIC ACICULAR PARTICLES AND THEIR PREPARATION
Henry C. Miller, Wilmington, and Alfred L. Oppegard, New Castle, Del., assignors to E. I. du Pont de Nemours and Company, Wilmington, Del., a corporation of Delaware
No Drawing. Filed May 10, 1963, Ser. No. 279,581
10 Claims. (Cl. 148—105)

This is a continuation-in-part of application Serial No. 21,601, filed April 12, 1960, now abandoned.

This invention relates to new ferromagnetic materials and to a method for their preparation. More particularly, this invention relates to non-pyrophoric acicular iron and iron alloy powders and to method for their preparation.

Fine particle ferromagnetic metals are of increasing interest for the production of permanent magnets because of the ease with which intricate and varied shapes can be produced to close tolerances and because magnetic properties superior to those of the magnet steels can be obtained. Metals and alloys which have been prepared in fine particle form include iron and iron-cobalt particles produced by electrodeposition into mercury as well as metal powders prepared by reduction of formates, thermal decomposition of carbonyls and by the Raney process. Although such finely divided metals possess desirable magnetic characteristics, they are prone to be pyrophoric and to require special handling procedures.

The present invention provides a finely divided, non-pyrophoric, ferromagnetic composition in the form of microscopic acicular particles consisting essentially by weight of 1.4–3% boron, 0.5–15% oxygen and 82–98.1% iron or an alloy of iron with cobalt and/or nickel containing at least 50% iron. Because of their magnetic properties, these iron and iron alloy compositions are particularly suited for use in the fabrication of permanent magnets and the present invention includes such magnets comprising compacts of these iron and iron alloy compositions.

The iron and iron alloy powders of this invention possess high coercivity, i.e., they have intrinsic coercive forces ranging from 100 to 1500 oersteds and higher. The saturation per gram or sigma value ($\sigma_s$) of these powders ranges up to 160 gauss cm.$^3$/g. and above, and the remanence ratio ($\sigma_r/\sigma_s$) is usually in the range of 0.4–0.7.

These iron and iron alloy powders are produced in the form of fine particles about 0.05–4 microns in length and about 0.01–0.1 micron in cross-sectional dimension. The particles are acicular by which is meant that they have axial ratios, i.e., the ratio of length to cross-sectional dimension, in the range of 5:1 to 100:1 and higher. Because of their small size and magnetic behavior, it is believed that each particle constitutes a single magnetic domain.

These particles tend to be straight, but the surface is rough and angular as though the particles were composed of smaller particles laterally displaced from one another. It is estimated these smaller particles or building blocks have diameters of roughly 100–200 A. By virtue of the high surface area of the particles, the powders of this invention are difficult to obtain absolutely free of the liquids employed during preparation, and it is not uncommon to observe the presence analytically of small proportions, i.e., less than 1% by weight of carbon and hydrogen.

The new iron and iron alloy compositions of this invention are prepared by a novel process which comprises treating, in a magnetic field, a solution of an iron salt, or mixture of iron salt with cobalt and/or nickel salts in such proportion that iron is at least 50% by weight of the total metals present, with a metal borohydride solution, collecting the precipitate produced, washing this precipitate quickly and thoroughly with water and then with a water-miscible organic solvent, and air-drying the precipitate.

In the preparation of the non-pyrophoric metal powders of this invention, it is preferred that the precipitate formed by reaction of metal salt with metal borohydride be washed promptly and thoroughly before being allowed to air-dry. If this washing is not prompt and thorough, excessively oxidized products are obtained. In warm humid weather the preferred procedure is to dry the products in a stream of air dried by passage through drying agents or traps at $-80°$ C.

The presence of a magnetic field during formation of the precipitate is an essential feature of the process of this invention. Although precipitates prepared in the absence of a magnetic field are superficially similar to those obtained when a magnetic field is present, products prepared without a field possess less desirable magnetic characteristics and consist of shorter particles having much lower axial ratios than those prepared in a magnetic field. Magnetic fields of at least 100 oersteds, preferably at least 1000 oersteds, are employed. These can be either D.C. or A.C. fields.

Although the solutions employed in the process of this invention can be mixed by adding the metal salt solution to the solution of metal borohydride, it is better to add the solution of borohydride to the solution of metal salt because the precipitate produced is a catalyst for the decomposition of metal borohydride. For this reason, the concentration of metal borohydride in the mixture is desirably maintained at a low value to avoid undue loss of borohydride by catalytic decomposition. It is desirable that the borohydride be added to the metal salt solution only as rapidly as it is consumed thereby.

While the proportions of metal borohydride and metal salt to be reduced can be varied considerably, approximately equimolar proportions based on the $BH_4^-$ and reducible metal ion are ordinarily employed. It is sometimes desirable, to compensate for losses due to catalytic decomposition, that the amount of borohydride be somewhat in excess of the minimum quantity required.

The concentrations of the metal salt and metal borohydride solutions may range up to the solubility limits of the borohydride and salt employed. However, it is usually preferable to employ solutions of lower concentration, and a concentration of about 1 molar has been found convenient. The solutions are brought together under such conditions of agitation that immediate and complete mixing occurs.

The process of this invention is normally carried out under atmospheric conditions of pressure and temperature. However, in certain cases it may be desirable to employ somewhat elevated temperatures to hasten the reaction of metal borohydride and metal salt. Such temperatures usually will not exceed about 100° C. Moderate variations in pressure, e.g., from 0.5–5 atmospheres, may also sometimes be desirable.

Although water is a convenient and readily available medium for carrying out the process of this invention, it will be appreciated that other media, particularly aqueous solutions of water-miscible organic liquids such as methanol, ethanol, acetone, and the like, can be used and may be preferable in certain instances. The proportion of the organic component in such aqueous media is governed by factors such as its effect on solubility of the reactants and the vapor pressure of the medium at reaction temperature. The organic component usually will not exceed 50% (by volume) of the mixture.

The metal borohydrides employed in this process will usualy be potassium borohydride or sodium borohydride because of their availability. However, other metal borohydrides, e.g., lithium borohydride, magnesium borohydride, calcium borohydride, and the like, can also be employed. The choice of reaction medium will depend somewhat on the identity of the metal borohydride. For example, when calcium borohydride is employed, it may be preferable to use alcohol or tetrahydrofuran in place of water as reaction medium.

A wide variety of metal salts, i.e., iron, cobalt and nickel salts, may be employed for the purposes of the present process providing they have adequate solubility in the reaction media. Metal salts ordinarily employed are the halide, sulfate, or nitrate. Salts of organic acids, e.g., acetic acid, can also be employed. Although either ferric or ferrous salts may be used, it is preferable to employ ferrous salts because of the smaller proportion of borohydride required or their reduction. In practice, ferrous sulfate, ferrous chloride, cobalt sulfate, cobalt chloride, cobalt nitrate, nickel sulfate, nickel nitrate, and nickel chloride have been found suitable for use in the process of this invention.

The raw materials employed in the practice of this invention can be of the usual commercial purity.

A convenient method for carrying out the process of this invention is to place a solution of metal salt as defined above in a corrosion-resistant, non-magnetic container, e.g., a glass or stainless steel container, equipped with an efficient agitator. Permanent magnets or solenoids are positioned adjacent to the exterior walls of the container to provide a magnetic field and the metal borohydride solution is introduced in a small stream to the rapidly stirred metal salt solution. Alternatively, if desired, the metal salt solution, as well as the borohydride solution, can be introduced continuously to the container in appropriately proportioned quantities and the reaction mixture continuously withdrawn. In this way, much larger quantities of reactants can be processed conveniently. In the laboratory, the process of this invention is conveniently carried out using a high speed, shear-type agitator placed between the poles of two horseshoe magnets, or in a round-bottom flask equipped with a stirrer and similarly placed in a magnetic field.

Although the products of this invention consist predominantly of iron or an iron alloy, there is associated therewith a small but significant quantity of boron, as indicated by analysis. It appears also that during the washing and drying steps controlled oxidation of the particles occurs with the result that the final product contains oxygen. The content of boron and of oxygen is believed to be responsible for the non-pyrophoric nature of the products. X-ray diffraction examination of the products usually shows only a diffuse pattern characteristic of $\alpha$-iron, i.e., of a body centered cubic structure.

The acicular powders of this invention can be compacted to produce permanent magnets. This compaction is preferably carried out under conditions such that alignment of the particles occurs. In forming such compacts, it is sometimes convenient to employ non-magnetic filler or binder materials, e.g., resins such as cellulose acetate, polymethyl methacrylate, polyvinyl butyral, and the like. When such fillers and binders are employed, the acicular particles can be introduced into the plastic while it is liquefied by the presence of a solvent, the mass being pressed while the elongated particles are aligned by an external field. During or after alignment of the particles, the excess solvent may be driven off by heat leaving a rigid structure of the magnetic material. Alternatively, the elongated particles may be mixed with a hot molten thermoplastic material, the mixture pressed while hot in the presence of an aligning magnetic field and then cooled. As a further alternative, a dry thermoplastic powder may be mixed with the elongated particles, the mixture heated and pressed in the presence of the aligning field, and cooled. In order to obtain sufficient alignment of the particles in these processes, it is desirable that a field of at least 1000 oersteds be employed. It is preferable to use an aligning field of at least 3000 oersteds.

As is known, when elongated particles are compacted to form magnets, two effects are encountered. First, saturation and residual induction increase as the particles are pressed closer together due to the increace in concentration of the magnetic material. Secondly, the coercive force of the compact decreases with increased packing due to magnetic interactions of the particles. The maximum energy product is believed to occur at a packing of about $\frac{1}{2}$ to $\frac{2}{3}$, that is, when there are about $\frac{1}{2}$ to $\frac{2}{3}$ of the theoretically possible number of elongated particles distributed uniformly per unit volume of material. For these reasons, it is desirable that the thermoplastic filler or binder material not exceed 50% by volume of the finished compact.

The magnetic properties of the products of this invention, which make them especially valuable for use in various applications, are the intrinsic coercive force, $H_{ci}$, the saturation per gram or sigma value $\sigma_s$, the remanence ratio, $\sigma_r/\sigma_s$, and the energy product, $BH_m$. The definitions of intrinsic coercive force and sigma value, and methods for measuring these properties are given in U.S. Patent 2,885,365. The sigma values herein were measured in a field of 4000 gauss. The remanence ratio, $\sigma_r/\sigma_s$, is the ratio of the retentivity per gram to the saturation per gram [see Bozorth's "Ferromagnetism," D. Van Nostrand Co., New York (1951), pp. 5–8]. The energy product, $BH_m$, is defined on pages 8–9 of the Bozorth text and is determined from the hysteresis loop of the ferromagnetic material as there described.

For the measurement of magnetic properties, the products were pressed at room temperature and 40 tons/sq. in. into bars 1" long and approximately $\frac{1}{10}$" x $\frac{1}{10}$" in crosssection. The bars weighed about 1 g. and had densities ranging from 3.0 to 3.5 g./cc. Exceptions to this procedure are noted in the examples.

The invention is illustrated further by the following examples in which the proportions of ingredients are expressed in parts by weight unless otherwise noted.

EXAMPLE I

Aqueous ferric chloride solution (2 cc.) containing 27 g. of $FeCl_3 \cdot 6H_2O$ per 100 ml. was added dropwise with vigorous stirring to 10 ml. of aqueous sodium borohydride (8.0 g./100 ml.) contained in a small glass vessel placed between the poles of a permanent magnet having a rated field strength of 5000 oersteds. A vigorous exothermic reaction took place and a black, magnetic solid separated. This solid was washed thoroughly with water, then with ethanol and finally with acetone, and dried by sucking air through a layer of solid spread on a filter. The product was a black strongly magnetic powder and was stable in air at room temperature.

A second preparation of this product was carried out as described above except that drying was conducted in a nitrogen atmosphere. The resultant powder was packed in a glass tube for measurement of magnetic properties. The saturation per gram or sigma value was 131 gauss cm.$^3$/g., and the intrinsic coercive force, 541 oersteds. Electron micrographs of the product showed that it consisted of acicular particles, 0.03–0.1 micron in width and 0.05–4 microns in length. These particles had serrated rather than smooth edges. The X-ray diffraction pattern of the product corresponds to that reported for $\alpha$-iron.

EXAMPLE II

The general procedure of Example I was employed except that the ferric chloride hexahydrate was dissolved in 95% ethanol (1 molar in $Fe^{+3}$) and the solution was cooled to $-80°$ C. before reaction. The cold solution (100 ml.) was placed in a magnetic field and 50 ml. aqueous sodium borohydride solution (8 g./100 ml.) was added thereto. The product had intrinsic coercive force of 840 oersteds (measured on the powder packed in a glass tube).

EXAMPLE III

A 5-inch crystallizing dish resting on the poles of a horseshoe magnet (rated field strength, 5000 oersteds) was charged with 70 ml. of 1 molar aqueous ferrous sulfate solution and 30 ml. of a 1 molar aqueous cobaltous chloride solution. The mixture was stirred with a paddle stirrer while 100 ml. of 1 molar sodium borohydride solution was added from a burette in approximately 3 minutes. The black voluminous magnetic precipitate produced was immediately collected by filtration on a sintered glass filter, washed thoroughly on the filter with water, rinsed with acetone and spread in a thin layer to air-dry. The product consisted of 2.93 g. of very fluffy, black, strongly magnetic powder.

This powder contained by analysis 64.83% Fe, 19.68% Co, 2.71% B, balance oxygen. As shown by electron micrographs, the particles were acicular and ranged in length from 0.2–2.0 microns and in width from 0.02–0.04 micron. They appeared to be made up of many smaller particles. The product gave an X-ray pattern characteristic of α-iron. The product (packed in a glass tube) had an intrinsic coercive force $H_{ci}$, of 1425 oersteds, a saturation per gram, $\sigma_s$, of 138.5 gauss cm.$^3$/g. and a remanence ratio ($\sigma_r/\sigma_s$) of 0.44.

In a second preparation carried out as described above, a product was obtained having, in bar form, a saturation per gram, $\sigma_s$, of 133 gauss cm.$^3$/g., a remanence ratio ($\sigma_r/\sigma_s$) of 0.629 and an energy product $BH_m$ of $1 \times 10^6$ gauss-oersteds.

Satisfactory products were also obtained in preparations carried out as described above except that, in place of acetone, methanol, ethanol, dioxane, and tetrahydrofuran were employed as wash-liquids. When washing with such an organic liquid was omitted, an inferior product resulted.

EXAMPLES IV–VIII

These examples illustrate the preparation of products containing various proportions of iron and cobalt. The general procedure was as described in Example III. The proportions of ferrous sulfate solution and cobaltous chloride solution were varied to conform to the iron-cobalt ratio desired, but the molar ratio of sulfate (Example VII), chloride (Example VIII) and sulfate and chloride (Examples IV–VI) to sodium borohydride was 1:1 in each case. The iron-cobalt ratios employed and the magnetic properties of the products (measured on compacted bars) are summarized in Table I.

Table I

| Example No. | Fe/Co Ratio (by weight) | Intrinsic Coercive Force, $H_{ci}$ (Oersteds) | Saturation per g., $\sigma_s$ (gauss cm.$^3$/g.) | Remanence Ratio ($\sigma_r/\sigma_s$) |
|---|---|---|---|---|
| IV | 81.0/19.0 | 1148 | 119 | 0.62 |
| V | 55.4/44.6 | 925 | 112 | 0.61 |
| VI | 88.4/11.6 | 990 | 129 | 0.62 |
| VII | 100/0 | 645 | 159 | 0.57 |
| VIII [1] | 100/0 | 570 | 132 | 0.52 |

[1] Ferrous chloride was used as a source of iron.

EXAMPLE IX

In this example, the reactants were mixed in a high speed shear-type agitator placed in the field of two horseshoe magnets, each having a rated field strength of 5000 oersteds, so mounted that like poles were opposed. One-molar solutions of the reactants were introduced through delivery tubes placed at opposite sides and extending nearly to the bottom of the agitator container. A third tube terminating at a point about 2″ above the impeller of the agitator served to withdraw excess liquid and reaction products. This tube was connected through a filter, which collected any solid products not retained by the magnetic field, to a large container for collecting liquid, and in turn to a source of vacuum. One-molar solutions (500 ml. each) of ferrous sulfate and sodium borohydride were introduced at equal rates through the delivery tubes. The solid product was washed thoroughly and quickly with water, rinsed with acetone and air-dried for 18 hours.

There was thus obtained 13 g. of fluffy, black powder, which exhibited an X-ray pattern characteristic of iron of small crystal size and contained by analysis 91.93% Fe and 2.13% B, the balance, except for incidental impurities, being oxygen. This fluffy solid was compacted by pressing under 75 tons/sq. in. at room temperature without binder to form a bar 1″ long and 0.1 x 0.1″ in transverse dimensions. This bar had had an intrinsic coercive force, $H_{ci}$, of 427 oersteds, a saturation per gram, $\sigma_s$, of 147 gauss cm.$^3$/g., a remanence ratio of 0.53 and an energy product, $BH_m$, of $0.5 \times 10^6$ gauss-oersteds. After magnetization, by exposure to a magnetic field of 5000 gauss provided by a horseshoe magnet it was useful as a permanent magnet.

EXAMPLE X

Using the apparatus described in Example IX, a mixture of 700 ml. 1 molar ferrous sulfate and 300 ml. 1 molar cobaltous chloride was reacted with 1000 ml. 1 molar sodium borohydride in the course of approximately 30 minutes. The product, after washing and drying in air, was a jet black, fluffy, magnetic powder weighing 30 g. X-ray analysis gave a broad pattern of iron. The powder was shown to have a surface area of 26.9 sq. m./g. by the Brunauer-Emmett-Teller gas adsorption method [J. Am. Chem. Soc. 60, 309 (1938)] and contained by analysis 57.1% Fe, 32.21% Co and 2.46% B, the balance, except for incidental impurities, being oxygen. The particles ranged in size from 0.1–0.5 micron in length and from 0.01–0.04 micron in width. A permanent bar magnet pressed at room temperature and 40 tons/sq. in. exhibited a coercive force, $H_{ci}$, of 982 oersteds, a saturation per gram of 117 gauss cm.$^3$/g. and a remanence ratio, $\sigma_r/\sigma_s$ of 0.61. The energy product $BH_m$ was $0.7 \times 10^6$ gauss-oersteds.

EXAMPLES XI AND XII

Using the general procedure of Example III, products containing various proportions of iron and nickel were prepared from aqueous solutions containing ferrous sulfate and nichelous chloride in various ratios. The iron-nickel ratios employed and the magnetic properties of compacted bars of the products are summarized in Table II.

Table II

| Example No. | Fe/Ni Ratio (by weight) | Intrinsic Coercive Force, $H_{ci}$ (oersteds) | Saturation g., $\sigma_s$ (gauss cm.$^3$/g.) | Remanence Ratio ($\sigma_r/\sigma_s$) |
|---|---|---|---|---|
| XI | 90/10 | 975 | 120 | 0.61 |
| XII | 50/50 | 795 | 98 | 0.58 |

Bar magnets of the alloy powders of the invention can readily be made following conventional procedures. To illustrate, an iron alloy powder was prepared from a mixture of salts containing iron and cobalt in an atomic ratio of 7:3 in a manner analogous to Example III. The alloy powder was thoroughly mixed with a benzene solution of polymethyl methacrylate containing 0.1 g. of polymer in 100 cc. of benzene. Mixing was continued until the benzene had evaporated. The weight ratio of alloy to polymer was 50:1. The resulting polymer-coated alloy powder was placed in a bar mold and compressed at room temperature under a pressure of 50 tons/sq. in. The bar so formed was magnetized by exposure to a field of 5000 oersteds. This magnetized bar readily attracted iron particles, i.e., it was a permanent magnet. The bar exhibited a coercive force, $H_{ci}$, of 600 oersteds, a saturation/gram sigma value, $\sigma_s$, of 125 gauss cm.$^3$/g., and a remanence ratio, $\sigma_r/\sigma_s$, of 0.59.

EXAMPLES XIII–XVI

Non-pyrophoric acicular iron powders were prepared from ferrous sulfate solution by treatment with sodium borohydride solution according to the general procedure of Example III with variations in molarity and volume, as indicated in Table III. The table also indicates the identity of the water-miscible organic wash liquid used and the boron content of the products.

*Table III*

| Example No. | Reactant Solutions (Volume and Molarity) | | Wash Liquid | Boron Content of Product (percent) |
|---|---|---|---|---|
| | FeSO$_4$ | NaBH$_4$ | | |
| XIII | 200 cc., 0.5 M | 50 cc., 1 M | Acetone | 2.70 |
| XIV [1] | 100 cc., 1 M | 50 cc., 1 M | 95% Ethanol | 1.44 |
| XV | 100 cc., 1 M | 50 cc., 2 M | Acetone | 1.91 |
| XVI | 100 cc., 1 M | 100 cc., 0.5 M | 95% Ethanol | 1.80 |

[1] This product had an intrinsic coercive force, H$_{ci}$, of 473 oersteds and a saturation per gram, $\sigma_s$, of 137 gauss cm.$^3$/g.

EXAMPLE XVII

A non-pyrophoric acicular iron powder was prepared by treatment of 1 liter of 1 molar ferrous sulfate solution with 0.98 liter of 1 molar sodium borohydride solution using the apparatus and procedure described in Example IX. The product had an intrinsic force, H$_{ci}$, of 382 oersteds and a saturation per gram, $\sigma_s$, of 167 gauss cm.$^3$/g. This product was used in the preparation of a magnetic recording member as described below.

A mixture of 5.17 g. of the above non-pyrophoric acicular iron powder and 31 g. of distilled γ-butyrolactone was milled for 3 hours in a centrifugal mill. Material recovered from the mill amounted to 33.5 g. To this was added 30 g. of γ-butyrolactone and the mixture allowed to settle overnight. After settling, the supernatant liquid (38.4 g.) was decanted and the residue was transferred to a 6-oz. glass jar using 8.4 g. of γ-butyrolactone for rinsing during the transfer. Glass beads (40.4 g.) were added to the jar and the mixture was rolled for 15.5 hours. At the end of this period, 3.4 g. of polyvinyl fluoride and 0.05 g. of dioctyl sodium sulfosuccinate were added and milling continued for 2 hours. A further 0.8 g. of polyvinyl fluoride was added and the mixture was sand-milled three times through a 450 mesh screen. The final dispersion (34 g.) contained 33.1% solids, of which 44.2% was Fe.

The above dispersion was cast on a polished plate glass surface, using a 7.5 mil doctor knife. The cast dispersion was placed along the axis of a solenoid having a field strength of 1950 oersteds and a D.C. field was applied first in one direction, then in the other for a total of six applications. The cast dispersion was then coalesced by exposure for 75 seconds at a distance of ¼″ to the heat from a surface at 380° C. For support, a layer of cellulose acetate was cast over the coalesced dispersion using a 12 mil doctor knife and, after drying of the acetate film, the composite was stripped from the glass plate. A recording tape was prepared by slitting the composite into several strips ¼″ in width which were then spliced end to end. This tape was employed for recording the human voice and was entirely satisfactory in this use. Reproduction of the voice was clear and free from noise.

This invention provides finely divided iron and iron alloy powders in a non-pyrophoric condition by a simple, straightforward process. These powders require no coating or other treatment to render them insensitive to air and are readily compacted to form permanent magnets. For long term use with retention of optimum magnetic properties, it is desirable to protect the particles by an organic or metallic matrix just as steel objects are protected against rust and corrosion.

For the most part, the products of this invention have very high coercive forces, i.e., coercive forces of 500 oersteds and above, which make them especially suitable for use in the fabrication of permanent magnets, and in other uses where acicular magnetic particles of high coercive force are employed. Products having coercive forces in the range below about 500 oersteds are also suitable for use in the preparation of magnetic recording members.

Since obvious modifications and equivalents in the invention will be evident to those skilled in the chemical arts, we propose to be bound solely by the appended claims.

The embodiments of the invention in which an exclusive property or privilege is claimed are defined as follows:

1. A method for preparing ferromagnetic, nonpyrophoric acicular particles comprising reacting in a magnetic field of at least 100 oersteds a solution of an iron salt with a metal borohydride solution, collecting the precipitate, washing it promptly, quickly and thoroughly with water and then with a water-miscible organic solvent and air-drying the precipitate, the prompt, quick and thorough washing and air-drying steps being effected to achieve controlled oxidation of the resulting particles.

2. A method for preparing ferromagnetic, nonpyrophoric, acicular particles comprising reacting in a magnetic field of at least 100 oersteds, a solution of a mixture of an iron salt and a cobalt salt in such proportion that iron is at least 50% by weight of the total metals present, with a metal borohydride solution, collecting the precipitate, washing it promptly, quickly and thoroughly with water and then with a water-miscible organic solvent and air-drying the precipitate, the prompt, quick and thorough washing and air-drying steps being effected to achieve controlled oxidation of the resulting particles.

3. A method for preparing ferromagnetic, nonpyrophoric acicular particles comprising reacting in a magnetic field of at least 100 oersteds a solution of a mixture of an iron salt and a nickel salt in such proportions that iron is at least 50% by weight of the total metals present, with a metal borohydride solution, collecting the precipitate, washing it promptly, quickly and thoroughly with water and then with a water-miscible organic solvent and air-drying the precipitate, the prompt, quick and thorough washing and air-drying steps being effected to achieve controlled oxidation of the resulting particles.

4. A method of preparing ferromagnetic, nonpyrophoric acicular particles which comprises reacting, in solution in a magnetic field of at least 100 oersteds, a metal borohydride with a member selected from the group consisting of (1) an iron salt, (2) a mixture of an iron salt and a cobalt salt, (3) a mixture of an iron salt and a nickel salt and (4) a mixture of an iron salt, a cobalt salt and a nickel salt, each of said mixtures (2), (3) and (4) being composed of at least 50% iron by weight of total metal present, collecting the resulting precipitate, washing said precipitate promptly, quickly and thoroughly with water and then with a water-miscible organic solvent, and air drying the thus washed precipitate, the prompt, quick and thorough washing and air-drying steps being effected to achieve controlled oxidation of the resulting particles.

5. A method of claim 4 wherein a magnetic field of at least 1000 oersteds is employed.

6. A method of claim 5 wherein the metal borohydride is selected from the group consisting of sodium borohydride and potassium borohydride.

7. Ferromagnetic, non-pyrophoric acicular particles about 0.05–4 microns in length and about 0.01–0.1 micron in cross sectional dimension, the ratio of length to cross sectional dimension being at least 5:1, said particles consisting essentially by weight of 1.4–3% boron, 0.5–15% oxygen and the balance iron.

8. Ferromagnetic non-pyrophoric acicular particles about 0.05–4 microns in length and about 0.01–0.1 micron in cross sectional dimension, the ratio of length to cross sectional dimension being at least 5:1, said particles consisting essentially by weight of 1.4–3% boron, 0.5–15% oxygen and the balance an iron-nickel alloy containing at least 50% iron.

9. Ferromagnetic non-pyrophoric acicular particles about 0.05–4 microns in length and about 0.01–0.1 micron in cross sectional dimension, the ratio of length to cross sectional dimension being at least 5:1, said particles consisting essentially by weight of 1.4–3% boron, 0.5–15% oxygen and the balance an iron-cobalt alloy containing at least 50% iron.

10. Ferromagnetic, non-pyrophoric acicular particles about 0.05–4 microns in length and about 0.01–0.1 micron in cross sectional dimension, the ratio of length to cross sectional dimension being at least 5:1, said particles consisting essentially by weight of 1.4–3% boron, 0.5–15% oxygen and the balance an iron-cobalt-nickel alloy containing at least 50% iron.

References Cited by the Examiner
UNITED STATES PATENTS

| | | | |
|---|---|---|---|
| 2,287,771 | 6/42 | Alexander | 75—.55 |
| 2,660,522 | 11/53 | Marquaire | 75—.55 |
| 2,726,170 | 12/55 | Warf et al. | 75—123 X |
| 2,813,789 | 11/57 | Glaser | 75—123 |
| 3,026,215 | 3/62 | Fukuda et al. | 148—105 X |

DAVID L. RECK, *Primary Examiner.*